(12) United States Patent
Shannon et al.

(10) Patent No.: US 8,037,343 B2
(45) Date of Patent: Oct. 11, 2011

(54) TRAP-BASED CONFIGURATION AUDIT

(75) Inventors: Frank Shannon, Arnold, MD (US); Roman Krzanowski, White Plains, NY (US); Vincent Alesi, Yorktown Heights, NY (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 210 days.

(21) Appl. No.: 12/560,058

(22) Filed: Sep. 15, 2009

(65) Prior Publication Data
US 2011/0066876 A1 Mar. 17, 2011

(51) Int. Cl.
*G06F 11/00* (2006.01)
(52) U.S. Cl. .......... 714/4.3; 714/4.1; 714/4.11; 714/4.4; 714/37
(58) Field of Classification Search .................... 714/4.1, 714/4.11, 4.3, 4.4, 37
See application file for complete search history.

(56) References Cited

U.S. PATENT DOCUMENTS

| | | | | |
|---|---|---|---|---|
| 6,490,690 B1* | 12/2002 | Gusler et al. | .................... | 714/4.3 |
| 6,883,120 B1* | 4/2005 | Banga | .......................... | 714/47.1 |
| 7,043,661 B2* | 5/2006 | Valadarsky et al. | ............. | 714/4.1 |
| 7,043,663 B1* | 5/2006 | Pittelkow et al. | .............. | 714/4.4 |
| 7,069,473 B2* | 6/2006 | Yasuda | ............................ | 714/37 |
| 7,143,153 B1* | 11/2006 | Black et al. | .................... | 709/223 |
| 7,237,138 B2* | 6/2007 | Greenwald et al. | ............ | 714/4.3 |
| 7,702,978 B2* | 4/2010 | Lewis et al. | .................... | 714/725 |
| 7,707,559 B2* | 4/2010 | Reddy | ........................... | 717/131 |
| 7,809,811 B1* | 10/2010 | Rao | ................................ | 709/221 |
| 2002/0156888 A1* | 10/2002 | Lee et al. | ....................... | 709/224 |
| 2002/0157035 A1* | 10/2002 | Wong et al. | ....................... | 714/4 |
| 2002/0178396 A1* | 11/2002 | Wong et al. | ....................... | 714/4 |
| 2003/0126195 A1* | 7/2003 | Reynolds et al. | ............. | 709/203 |
| 2004/0006546 A1* | 1/2004 | Wedlake et al. | ................ | 706/46 |
| 2004/0025086 A1* | 2/2004 | Gorday et al. | .................. | 714/37 |
| 2007/0061663 A1* | 3/2007 | Loyd et al. | ..................... | 714/746 |
| 2007/0230361 A1* | 10/2007 | Choudhury | .................... | 370/250 |
| 2008/0109568 A1* | 5/2008 | Rengarajan et al. | ............ | 710/19 |
| 2008/0186202 A1* | 8/2008 | Vaswani et al. | .......... | 340/870.03 |
| 2009/0276658 A1* | 11/2009 | Lind et al. | ........................ | 714/4 |
| 2010/0115340 A1* | 5/2010 | Ruan et al. | ....................... | 714/37 |
| 2011/0055636 A1* | 3/2011 | DeHaan et al. | ................. | 714/37 |

* cited by examiner

*Primary Examiner* — Robert Beausoliel, Jr.
*Assistant Examiner* — Joshua Lottich

(57) ABSTRACT

A method includes generating a layer three trap packet that includes an indicator that indicates an audit request of a resident configuration file, transmitting the layer three trap packet to another device, receiving a reference configuration file in response to transmitting the layer three trap packet, comparing the resident configuration file with the reference configuration file, and replacing the resident configuration with the reference configuration file when a difference between the reference configuration file and the resident configuration file exists.

20 Claims, 12 Drawing Sheets

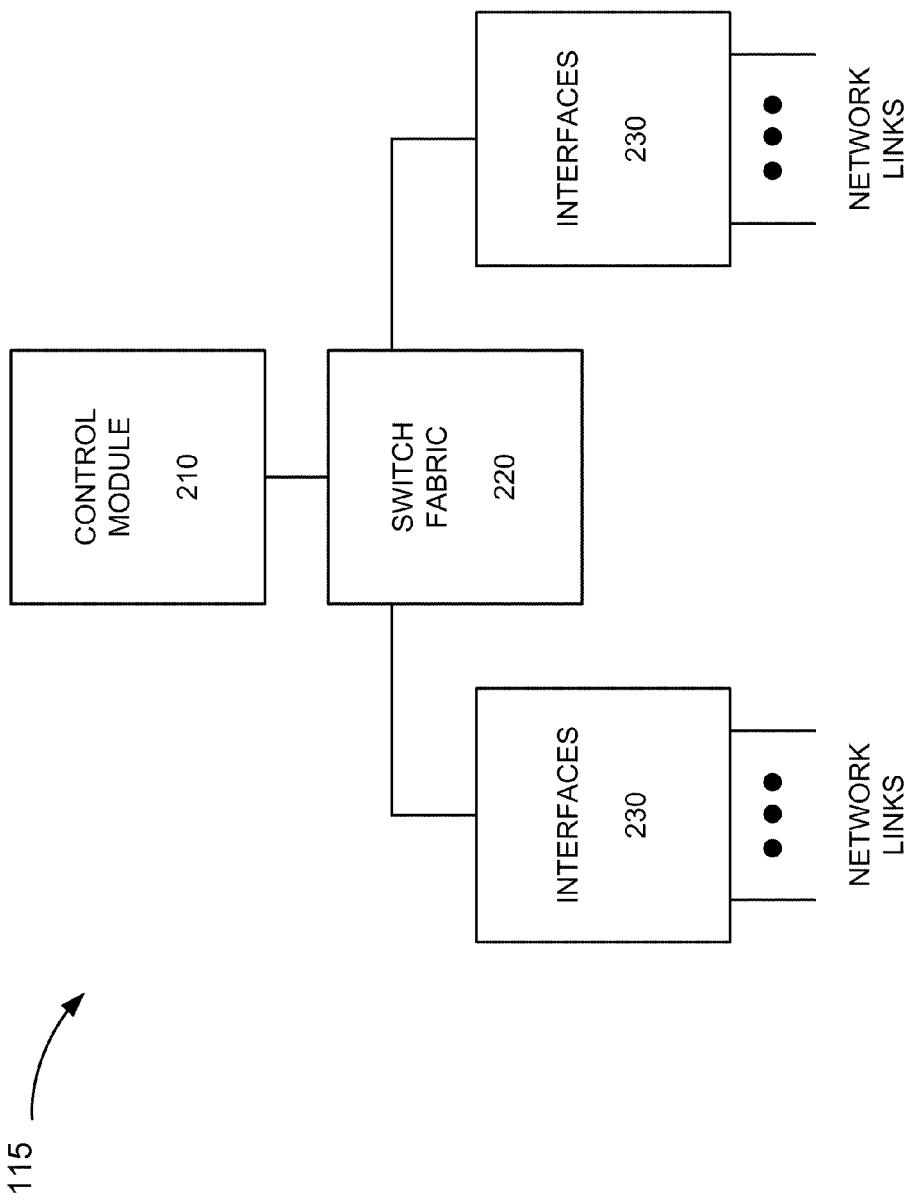

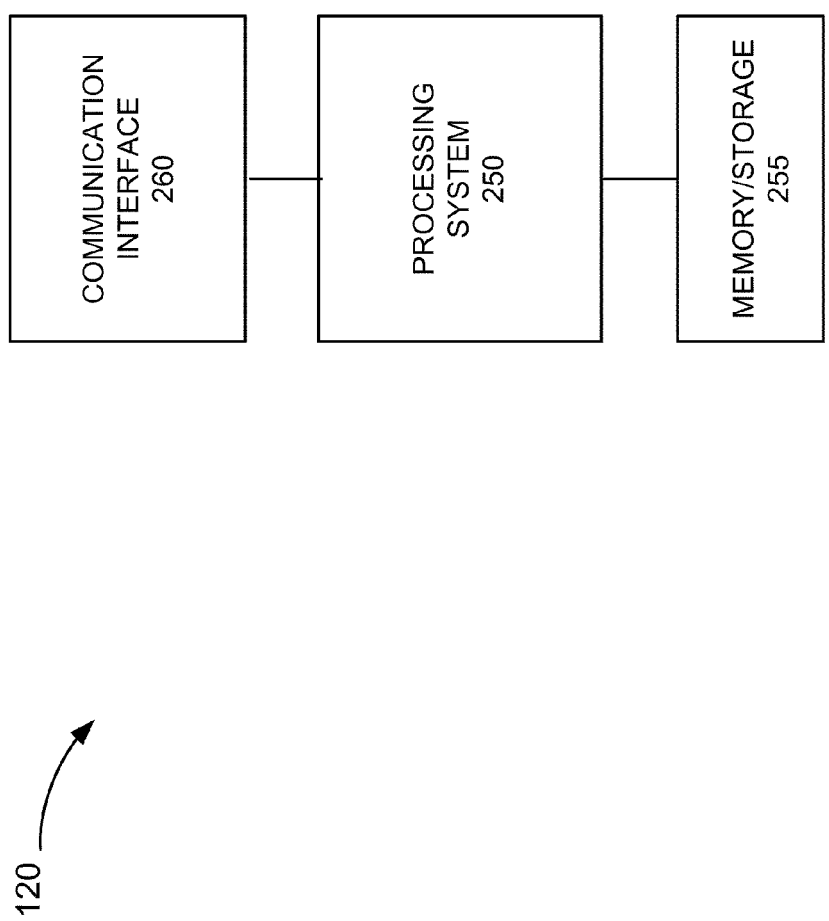

TRAP-BASED CONFIGURATION AUDIT

BACKGROUND

There are various occurrences that necessitate the audit or verification of a configuration associated with a network device. For example, when the network device needs to be reset, when the network device goes through a power cycle, when a new network device is installed, or when the integrity of the configuration associated with the network device is uncertain, an administrator may initiate an audit process to verify the configuration of the network device. Typically, the administrator may manually download a reference configuration file to the network device. Unfortunately, the audit process may be time consuming, utilize human resources, and/or may cause interruption of services to customers.

BRIEF DESCRIPTION OF THE DRAWINGS

FIG. 2A is a diagram illustrating exemplary components of a network interface device (NID) illustrated in FIG. 1;

FIG. 2B is a diagram illustrating exemplary components of a management device illustrated in FIG. 1;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "packet," as used herein, is intended to be broadly interpreted to include a type of data unit or arrangement of data. For example, a packet may include a cell, a datagram, a frame, a protocol data unit (PDU), or a portion or a fragment of a cell, a portion of a datagram, a portion of a frame, or a portion of a PDU.

As will be described herein, a network device may automatically conduct a self-auditing process based on a layer three trap packet. In one implementation, the network device may initiate the audit process. In other implementations, the audit process may be initiated by a user-based request. During the audit process, the network device may automatically obtain a reference configuration file. In one implementation, the network device may generate a layer three trap packet. Depending on the circumstances with which the layer three trap packet is generated, various error codes may be indicated in the layer three trap packet. However, each of the error codes may be indicative of an audit process.

The network device may transmit the layer three trap packet to another network device (e.g., a management device). The management device may store the reference configuration file. Upon receipt of the layer three trap packet, the management device may provide the reference configuration file to the network device.

When the network device receives the reference configuration file, the network device may utilize the reference configuration file in various ways. For example, in one implementation, the network device may compare a resident configuration file with the reference configuration file. If a difference exists, the network device may replace the resident configuration file with the reference configuration file. If a difference does not exist, the network device may delete the reference configuration file. In another implementation, the network device may replace the resident configuration file with the reference configuration file without comparing the resident configuration file and the reference configuration file.

Figure 1:
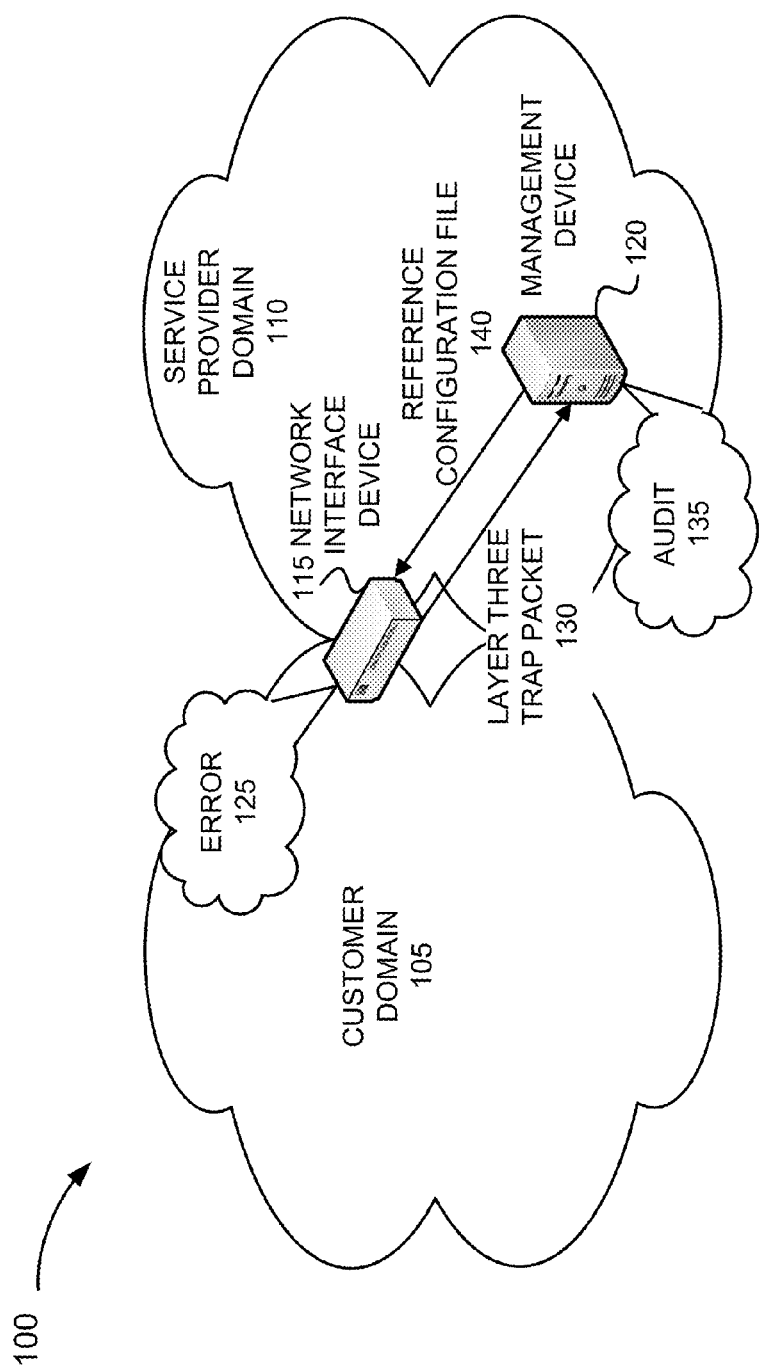
FIG. 1 is a diagram illustrating an exemplary environment in which a trap-based auditing scheme may be implemented.

FIG. 1 is a diagram illustrating an exemplary environment in which a trap-based auditing scheme may be implemented. As illustrated, environment 100 may include a customer domain 105 and a service provider domain 110. A network interface device (NID) 115 may provide ingress and egress with respect to customer domain 105 and service provider domain 110. Service provider domain 110 may include management device 120.

Customer domain 105 may include one or multiple networks of any type. Customer domain 105 may include network devices and/or customer end devices. By way of example, customer domain 105 may include a private network, a local area network (LAN), an Intranet, a wide area network (WAN), a metropolitan area network (MAN), a data network, or some other type of network.

Service provider domain 110 may include one or multiple networks of any type. Service provider domain 110 may provide services to customer domain 105. By way of example, service provider domain 110 may include may include a public network, an access network to the Internet, a wide area network (WAN), and/or a telephone network (e.g., a wireless communication network or the public switched telephone network (PSTN)).

NID 115 may include a network device having communication capability. For example, NID 115 may include a switch. As previously described, NID 115 may provide ingress and egress with respect to customer domain 105 and service provider domain 110. In one implementation, NID 115 may provide switching services. NID 115 may also provide packet translation services with respect to packets traversing to/from customer domain 105 and service provider domain 110. NID 115 may include performance management capabilities.

Management device 120 may include a network device having communication capability. Management device 120 may store reference configuration files for one or more network devices (e.g., NID 115) in service provider domain 110. The reference configuration files may be updated by a network administrator. A reference configuration file may include configuration and/or setting information associated with NID 115. The reference configuration file may include one or multiple files. Management device 120 may facilitate in the management of NID 115.

According to an exemplary implementation, NID 115 may detect an error 125 in its operation. NID 115 may initiate a diagnostic process and may generate a layer three trap packet 130. Layer three trap packet 130 may include an error code corresponding to error 125. NID 115 may transmit layer three trap packet 130 to management device 120.

Management device 120 may receive layer three trap packet 130. Based on the error code include in layer three trap packet 130, management device 130 may determine that NID 115 is requesting an audit 135. In response thereto, management device 130 may transmit a reference configuration file 140 to NID 115.

NID 115 may receive reference configuration file 140. NID 115 may utilize reference configuration file 140. For example, in one implementation, depending on error 125, NID 115 may compare a resident configuration file with reference configuration file 140. Depending on the outcome of the comparison, NID 115 may replace the resident configuration file with reference configuration file 140, or delete reference configuration file 140. In another implementation, NID 115 may simply replace the resident configuration file with reference configuration file 140. In either implementation, NID 115 may restore its integrity and recover from error 125. NID 115 may transmit a restore message (not illustrated) to management device 120, which may indicate that NID 115 has successfully recovered. Alternatively, NID 115 may transmit a failure message (not illustrated) to management device 120, which may indicate that NID 115 has not successfully recovered. In such instances, management device 120 and/or an administrator (not illustrated) may take further corrective measures.

As a result of the foregoing, a network device, such as NID 115, may maintain its operational integrity without human intervention. Additionally, an auditing process may be expedited in comparison to a user requesting that a reference configuration file be provided to the network device. Since implementations have been broadly described, variations to the above implementations will be discussed further below.

It will be appreciated that the number of devices and/or configuration in environment 100 is exemplary and provided for simplicity. In practice, environment 100 may include more, fewer, and/or different devices, and/or differently arranged devices than those illustrated in FIG. 1 and described herein.

FIG. 2A is a diagram illustrating exemplary components of NID 115. As illustrated in FIG. 2A, NID 115 may include a control module 210, a switch fabric 220, and a group of interfaces 230. In other implementations, NID 115 may include fewer, additional, different, and/or differently arranged components than those illustrated in FIG. 2A and described herein.

Control module 210 may include one or multiple processors, microprocessors, application specific integrated circuits (ASICs), field programming gate arrays (FPGAs), and/or processing logic that may be optimized for networking and/or communications. Control module 210 may perform high level management functions for NID 115. In some implementations, control module 210 may include packet inspection and/or packet translation functionality. Control module 210 may also include a static memory (e.g. a read only memory (ROM)), a dynamic memory (e.g. a random access memory (RAM)), onboard cache, and/or flash memory for storing data and/or machine-readable instructions.

Switch fabric 220 may include one or multiple switching planes to facilitate communication among interfaces 230 and/or system control module 210. In one implementation, each of the switching planes may include a single-stage switch or a multi-stage switch of crossbar elements. Switch fabric 220 may also, or alternatively, include processors, memories, and/or paths that permit communication among system control module 210 and interfaces 230.

Interfaces 230 may include devices or assemblies, such as line cards, for receiving incoming packets from network links associated with customer domain 105 and service provider domain 110 (or from other interfaces 230) and for transmitting the packets to network links associated with customer domain 105 and service provider domain 110 (or to other interfaces 230). For example, interfaces 230 may include wired interfaces, such as, Ethernet interfaces, optical carrier (OC) interfaces, and/or asynchronous transfer mode (ATM) interfaces. Interfaces 230 may manage a set of input ports via which packets can be received and a set of output ports via which packets can be transmitted. Interfaces 230 may include one or more memories, one or more processors, and/or other logic.

FIG. 2B is a diagram illustrating exemplary components of management device 120. As illustrated, management device 120 may include a processing system 250, a memory/storage 255, and a communication interface 260. In other implementations, management device 120 may include fewer, additional, and/or different components, and/or a different arrangement of components than those illustrated in FIG. 2B and described herein.

Processing system 250 may include one or more processors, microprocessors, data processors, co-processors, network processors, ASICs, controllers, programmable logic devices, chipsets, FPGAs, or some other component that may interpret and/or execute instructions and/or data. Processing system 250 may control the overall operation, or a portion thereof, of management device 120, based on, for example, an operating system and/or various applications.

Memory/storage 255 may include memory and/or secondary storage. For example, memory/storage 255 may include a RAM, a dynamic RAM, a ROM, a programmable ROM, a flash memory, and/or some other type of memory. Memory/storage 255 may include a hard disk (e.g., a magnetic disk, an optical disk, a magneto-optic disk, a solid state disk, etc.) or some other type of computer-readable medium, along with a corresponding drive. The term "computer-readable medium" is intended to be broadly interpreted to include a memory, a secondary storage, a compact disc (CD), a digital versatile disc (DVD), or the like. The computer-readable medium may include, for example, a physical memory device or a logical memory device. A logical memory device may include memory space within a single physical memory device or spread across multiple physical memory devices.

Memory/storage 255 may store data, application(s), and/or instructions related to the operation of management device 120. For example, memory/storage 255 may store reference configuration files associated with network devices (e.g., NID 115) that management device 120 manages. Memory/storage 255 may store a database (not illustrated) that interprets error codes received in trap packets from network devices (e.g., NID 115).

Communication interface 260 may permit management device 120 to communicate with other devices, networks, and/or systems. For example, communication interface 260 may include a wireless and/or wired interface.

As described herein, management device 120 may perform certain operations in response to processing system 250 executing software instructions contained in a computer-readable medium, such as memory/storage 255. The software instructions may be read into memory/storage 255 from another computer-readable medium or from another device via communication interface 260. The software instructions contained in memory/storage 260 may cause processing system 250 to perform processes described herein. Alternatively, hardwired circuitry may be used in place of or in combination with software instructions to implement processes described herein. Thus, implementations described herein are not limited to any specific combination of hardware circuitry and software.

Figure 3:
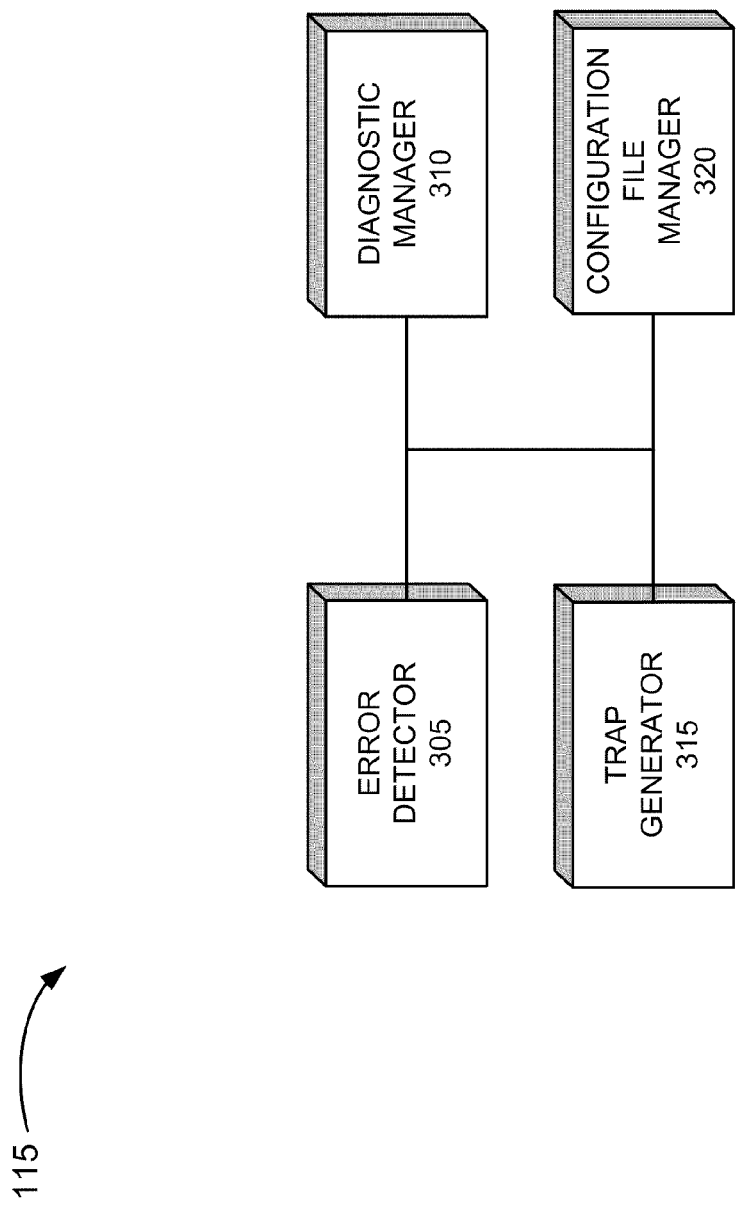
FIG. 3 is a diagram illustrating exemplary functional components of the NID.

FIG. 3 is a diagram illustrating exemplary functional components of NID 115. As illustrated, NID 115 may include an error detector 305, a diagnostic manager 310, a trap generator 315, and a configuration file manager 320. Error detector 305, diagnostic manager 310, trap generator 315, and configuration file manager 320 may be implemented in one or more of the components previously described with respect to FIG. 2. Error detector 305, diagnostic manager 310, trap generator 315, and configuration file manager 320 may be implemented in hardware or a combination of hardware and software. In other implementations, one or more of the functions associated with NID 115 may be implemented wholly, or partially, in another device (e.g., management device 120) associated with service provider domain 110.

Error detector 305 may detect errors that occur in NID 115. For example, error detector 305 may detect various hardware and/or software failures or errors, corruption, viruses, incorrect configurations, etc. Error detector 305 may also consider performance degradations (e.g., packet loss, packet misdirects, retransmissions, etc.) of NID 115 as an error. For example, performance degradations that exceed a threshold value and/or state may be considered an error. Error detector 305 may monitor various operations and/or processes performed by NID 115.

Diagnostic manager 310 may receive error information from error detector 305 and determine appropriate responses. For example, diagnostic manager 310 may determine whether NID 115 may need an audit (e.g., a verification of a resident configuration file) versus other types of response. In one implementation, diagnostic manager 310 may consult a lookup table or some other type of data arrangement. The lookup table may include a mapping between error information and diagnostic responses. One or more of the diagnostic responses may include performing an audit. Diagnostic manager 310 may also manage other operations associated with the maintenance, performance, and/or health of NID 115. For example, diagnostic manager 310 may initiate reboots and power cycles for NID 115 when certain errors occur and/or are detected.

Trap generator 315 may generate a trap (e.g., a packet) that indicates an error code. In one implementation, the trap may correspond to a layer three trap packet. The error code may correspond to an error corresponding to an audit request. In one implementation, trap generator 315 may generate the trap based on information provided by error detector 305 and/or diagnostic manager 310. In other implementations, trap generator 315 may generate the trap based on a user request. For example, an administrator may send a request to NID 115, which may trigger trap generator 315 to generate the trap.

Configuration file manager 320 may manage the configuration file resident on NID 115. Configuration file manager 320 may perform a compare between the resident configuration file and the reference configuration file. Configuration file manager 320 may determine, based on the comparing, whether the resident configuration needs to be replaced by the reference configuration file.

Although FIG. 3 illustrates exemplary functional components in NID 115, in other implementations, NID 115 may include additional, fewer, different, and/or differently arranged functional components than those illustrated in FIG. 3 and described herein. Additionally, or alternatively, one or more operations described as being performed by a particular functional component may be performed by one or more other functional components, in addition to or instead of the particular functional component.

As previously described, NID 110 may perform a trap-based audit to verify an integrity associated with a resident configuration file. Described below are exemplary operations and/or processes that may be performed by the functional components to provide the trap-based audit.

Figure 4A:
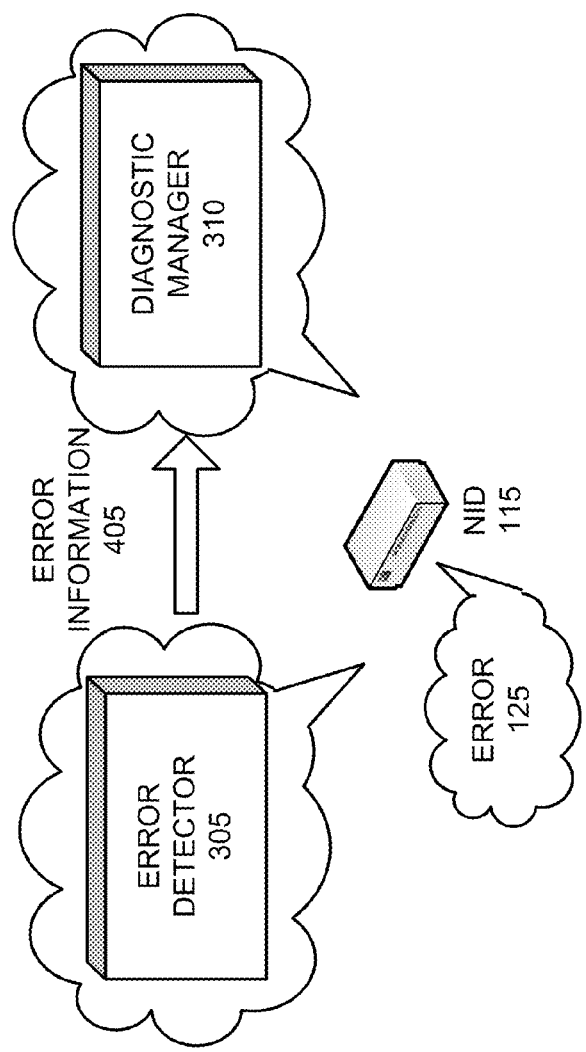
FIGS. 4A-4D are diagrams illustrating exemplary operations performed by the NID and the management device associated with a trap-based audit.

FIGS. 4A-4D are diagrams illustrating exemplary operations performed by NID 115 and management device 120 associated with a trap-based audit. Referring to FIG. 4A, assume that error detector 305 detects an error 125. Error 125 may correspond to a hardware error and/or a software error, a virus, memory corruption, performance degradation, and/or some other NID state that may negatively impact the performance of NID 115. As illustrated, error detector 305 may pass error information 405 to diagnostic manager 310. Error information 405 may indicate error 125.

Figure 4B:
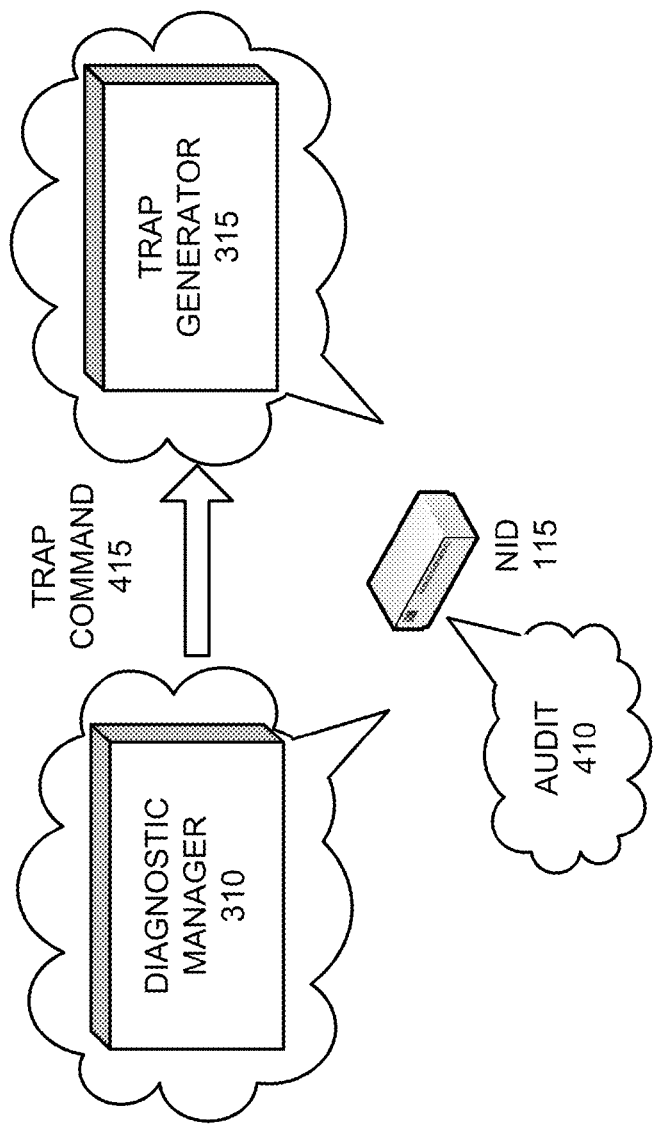

Referring to FIG. 4B, based on error information 405, diagnostic manager 310 may determine whether an audit 410 should be performed. For example, diagnostic manager 310 may consult a lookup table or some other type of data arrangement. In this example, it may be assumed that diagnostic manager 310 may determine that audit 410 should be performed. Diagnostic manager 310 may pass a trap command 415 to trap generator 315. Trap command 415 may instruct trap generator 315 to generate a trap.

Figure 4C:
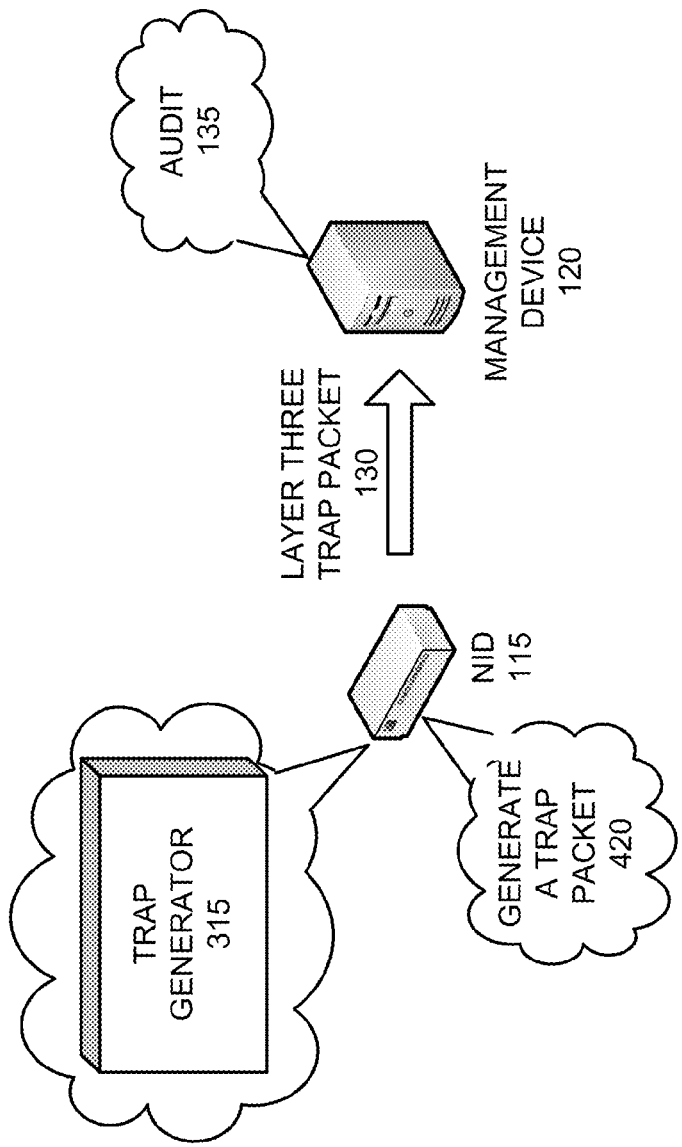

Referring to FIG. 4C, based on trap command 415, trap generator 315 may generate a trap packet 420 (e.g., layer three trap packet 130). Trap generator 315 may generate an appropriate error code for the generated trap to indicate that audit 410 should be performed. In one implementation, the generated trap may correspond to a layer three trap packet 130. Trap generator 315 may cause layer three trap packet 130 to be transmitted to management device 120. Management device 120 may receive layer three trap packet 130 and may determine, based on the error code, whether audit 135 of NID 115 needs to be performed. For example, in one implementation, management device 120 may map the error code to information in a database (not illustrated) that indicates audit 135 needs to be performed. It shall be assumed that management device 120 determines that audit 135 needs to be performed.

Figure 4D:
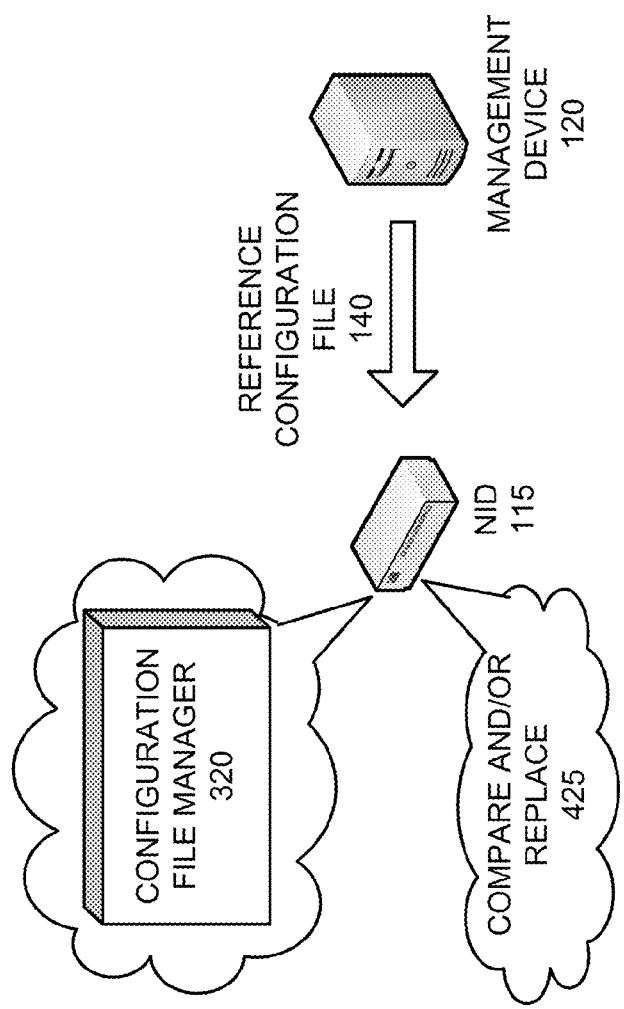

Referring to FIG. 4D, management device 120 may transmit reference configuration file 140 to NID 115. For example, in one implementation, a file transfer protocol (FTP) transfer of reference configuration file 140 may be performed. In other implementations, other types of protocols may be utilized (e.g., Simple Network Management Protocol (SNMP), Secure Shell (SSH), etc.). Configuration file manager 320 may receive reference configuration file 140. In one implementation, for example, depending on a type of error 125, configuration file manager 320 may perform compare and/or a replace 425 operations and/or processes with respect to a resident configuration file and reference configuration file 140. A decision to perform a compare and/or a replace operation/process may be an administrative, configurable parameter.

By way of example, in one implementation, configuration file manager 320 may replace the resident configuration file 140 without performing a comparison. For example, this may occur based on a severity level associated with error 125, a particular type of error 125 (e.g., a hardware failure versus a software failure), and/or a certainty level that an error exists with respect to error 125. The severity level and/or the certainty level may be parameters configured by, for example, an administrator.

By way of example, when error 125 corresponds to a virus, error 125 may be associated with a severity level that causes configuration file manager 320 to replace the resident configuration file 140 without performing a comparison. In contrast, when error 125 may be associated with performance degradation, configuration file manager 320 may perform a comparison. Additionally, or alternatively, when error 125 may correspond to a particular software failure, configuration file manager 320 may replace the resident configuration file 140 without performing a comparison. In contrast, when error 125 may correspond to a particular hardware failure, configuration file manager 320 may perform a comparison. Additionally, or alternatively, when error 125 may be associated with a particular certainty level (e.g., high), configuration file manager 320 may replace resident configuration file 140 without performing a comparison. In contrast, when error 125 may be associated with another certainty level (e.g., low), configuration file manager 320 may perform a comparison. By way of example, when error 125 corresponds to performance degradations, a certainty level that an error exists may not be as high as other types of errors.

In another implementation, configuration file manager 320 may perform a comparison between the resident configuration file and reference configuration file 140. When it is determined that there is no difference between the resident configuration file and reference configuration file 140, configuration file manager 320 may delete reference configuration file 140 from memory. When it is determined that there is a difference between the resident configuration file and reference configuration file 140, configuration file manager 320 may replace the resident configuration file with reference configuration file 140.

Although FIGS. 4A-4D illustrate exemplary operations associated with NID 115 and management device 120, in other implementations, additional, fewer, and/or different operations may be performed other than those described and illustrated in FIGS. 4A-4D. For example, as previously described, NID 115 may transmit a restore message to management device 120, which may indicate that NID 115 has successfully recovered. Alternatively, NID 115 may transmit a failure message to management device 120, which may indicate that NID 115 has not successfully recovered. In such instances, management device 120 and/or an administrator may take further corrective measures.

Figure 5:
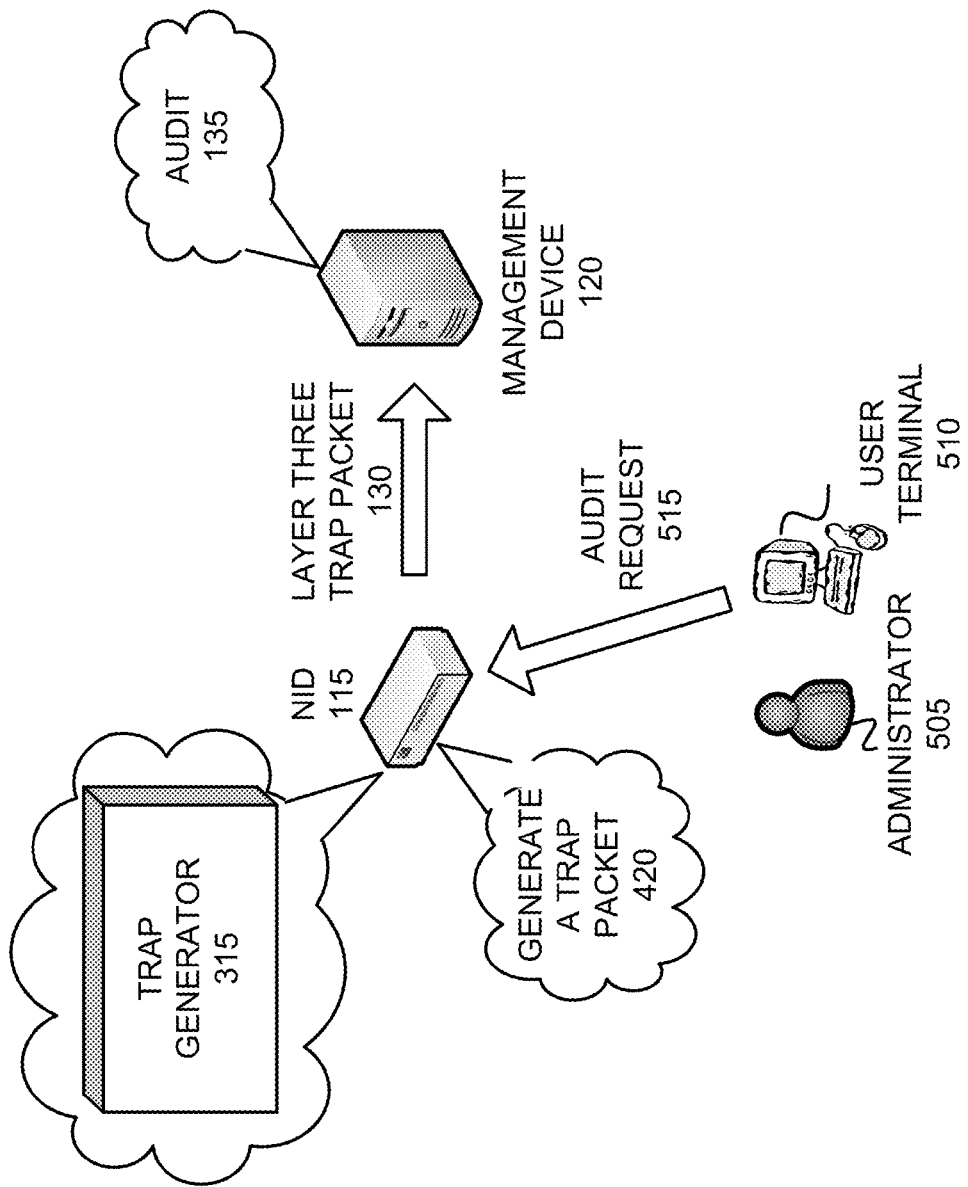
FIG. 5 is a diagram illustrating another implementation in which a trap-based audit may be performed.

FIG. 5 is a diagram illustrating another implementation in which a trap-based audit may be performed. As illustrated in FIG. 5, instead of error 125 being detected by error detector 305 and causing layer three trap packet 130 to be generated and transmitted to management device 120, layer three trap packet 130 may be user-invoked. For example, it may be assumed that an administrator 505 receives performance degradation information relating to NID 115 and would like to invoke a trap-based audit. In other instances, the administrator may invoke the trap-based audit based on an upgrade (e.g., a hardware upgrade), an installation of a new NID 115, etc. Administrator 505 may send an audit request 515, via a user terminal 510, to NID 115 (e.g., trap generator 315). In one implementation, audit request 515 may include error information 405. In other implementations, audit request 515 may not include error information (e.g., when an upgrade is involved, etc.). Audit request 515 may include information that instructs NID 115 to compare and/or replace 425, when reference configuration file 140 is received. Trap generator 315 may generate a trap packet 420 (e.g., layer three trap packet 130) based on audit request 515. Trap generator 315 may cause layer three trap packet 130 to be transmitted to management device 120. Management device 120 may receive layer three trap packet 130 and may determine, based on the error code, whether audit 135 of NID 115 needs to be performed. It shall be assumed that management device 120 determines that audit 135 needs to be performed. The remaining operations and/or processed, previously described with respect to FIG. 4D and elsewhere in this description, may be performed.

Although FIG. 5 illustrates exemplary operations associated with NID 115 and management device 120, in other implementations, additional, fewer, and/or different operations may be performed other than those described and illustrated in FIG. 5.

Figure 6:
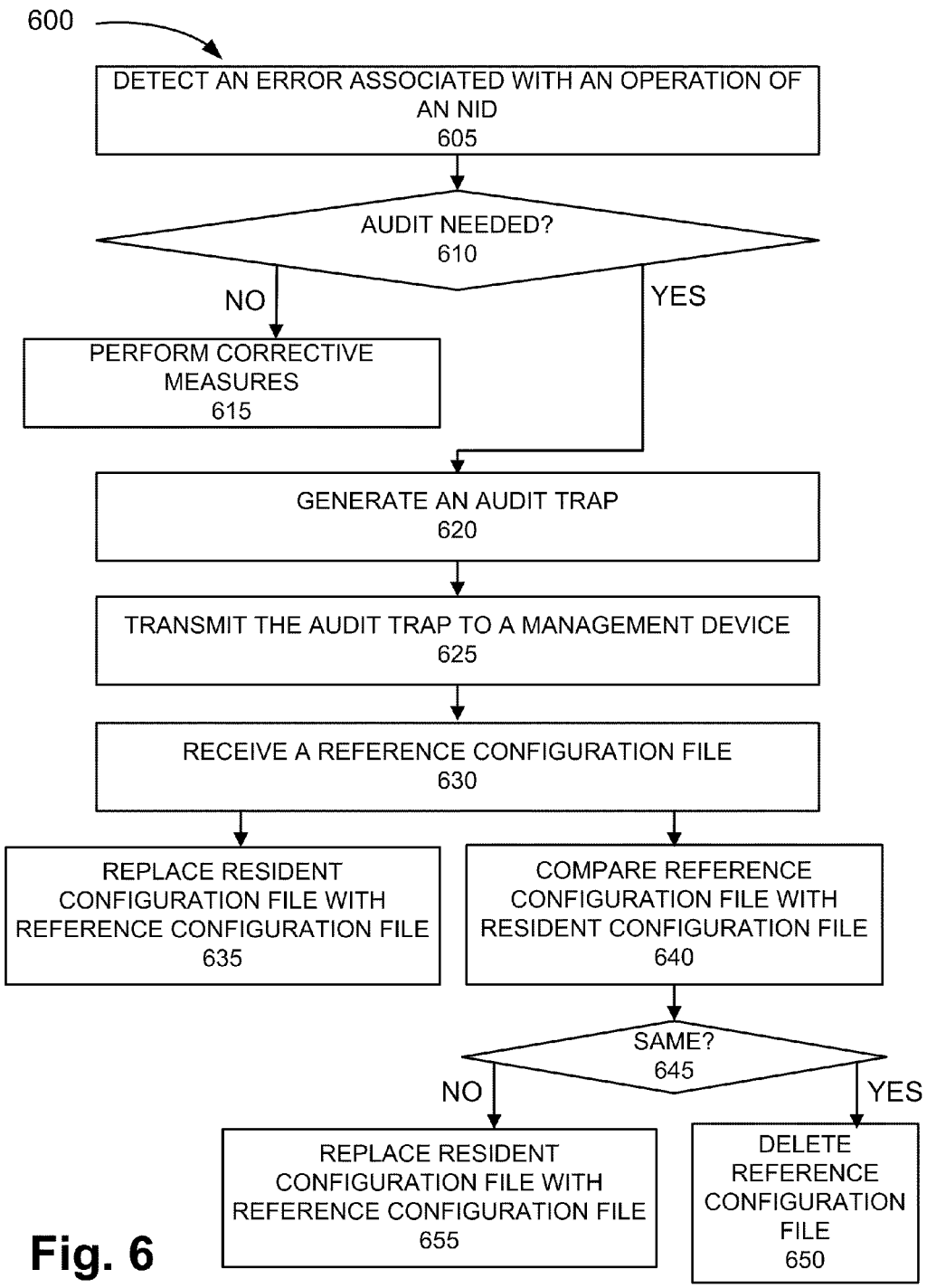
FIG. 6 is a flow diagram illustrating an exemplary process for implementing a trap-initiated audit.

FIG. 6 is a flow diagram illustrating an exemplary process 600 for implementing a trap-initiated audit. In one implementation, process 600 may be performed by NID 115.

Process 600 may include detecting an error associated with an operation of an NID (block 605). For example, as previously described, error detector 305 may detect various errors 125 (e.g., hardware and/or software failures, corruption, viruses, incorrect configurations, etc.). Error detection 305 may also consider performance degradations (e.g., packet loss, packet misdirects, retransmissions, etc.) of NID 115 as error 125. For example, performance degradations that exceed a threshold value and/or state may be considered error 125.

It may be determined whether an audit is needed (block 610). For example, as previously described, diagnostic manager 310 may determine whether NID 115 may need an audit (e.g., a verification of a resident configuration file) based on error information 405. In one implementation, diagnostic manager 310 may consult a lookup table or some other type of data arrangement. The lookup table may include a mapping between error information and diagnostic responses. One or more of the diagnostic responses may include performing an audit.

If it is determined that an audit is not needed (block 610—NO), corrective measures may be performed (block 615). For example, diagnostic manager 310 may perform corrective measures, other than requesting an audit.

If it is determined that an audit is needed (block 610—YES), an audit trap may be generated (block 620). For example, as previously described, diagnostic manager 310 may generate trap command 415 and issue trap command 415 to trap generator 315. Trap command 415 may instruct trap generator 315 to generate a trap. Trap generator 315 may generate a trap packet 420 based on trap command 415. Trap generator 315 may generate an appropriate error code for the generated trap packet to indicate that audit 410 should be performed. In one implementation, the generated trap packet may correspond to a layer three trap packet 130.

The audit trap may be transmitted to a management device (block 625). For example, as previously described, trap generator 315 may cause layer three trap packet 130 to be transmitted to management device 120.

A reference configuration file may be received (block 630). For example, as previously described, configuration file manager 320 may receive reference configuration file 140 from management device 120.

In one implementation, for example, depending on a type of error 125, configuration file manager 320 may perform compare and/or a replace 425 operations and/or processes with respect to a resident configuration file and reference configuration file 140. A decision to perform a compare and/or a replace operation/process may be an administrative, configurable parameter. Process 600 may continue, as described below, with respect to block 635 or blocks 640 through 655.

A resident configuration file may be replaced with the reference configuration file (block 635). For example, as previously described, in one implementation, configuration file manager 320 may replace the resident configuration file 140 without performing a comparison. For example, this may occur based on a severity level associated with error 125, a particular type of error (e.g., hardware failure versus software failure) and/or a certainty level that an error exists with respect to error 125.

The reference configuration file may be compared with a resident configuration file (block 640). For example, as previously described, in another implementation, configuration file manager 320 may perform a comparison between the resident configuration file and reference configuration file 140.

If it is determined that the reference configuration file and the resident configuration file are the same (block 645—YES), the reference configuration file may be deleted (block 650). For example, as previously described, configuration file manager 320 may delete reference configuration file 140 from memory.

If it is determined that the reference configuration file and the resident configuration file are not the same (block 645—NO), the resident configuration file may be replaced with the reference configuration file (block 655). For example, as previously described, configuration file manager 320 may replace the resident configuration file with reference configuration file 140.

Although FIG. 6 illustrates an exemplary process 600, in other implementations, additional, fewer, and/or different operations than those described, may be performed. For example, as previously described, NID 115 may transmit a restore message to management device 120, which may indicate that NID 115 has successfully recovered. Alternatively, NID 115 may transmit a failure message to management device 120, which may indicate that NID 115 has not successfully recovered. In such instances, management device 120 and/or an administrator may take further corrective measures.

Figure 7:
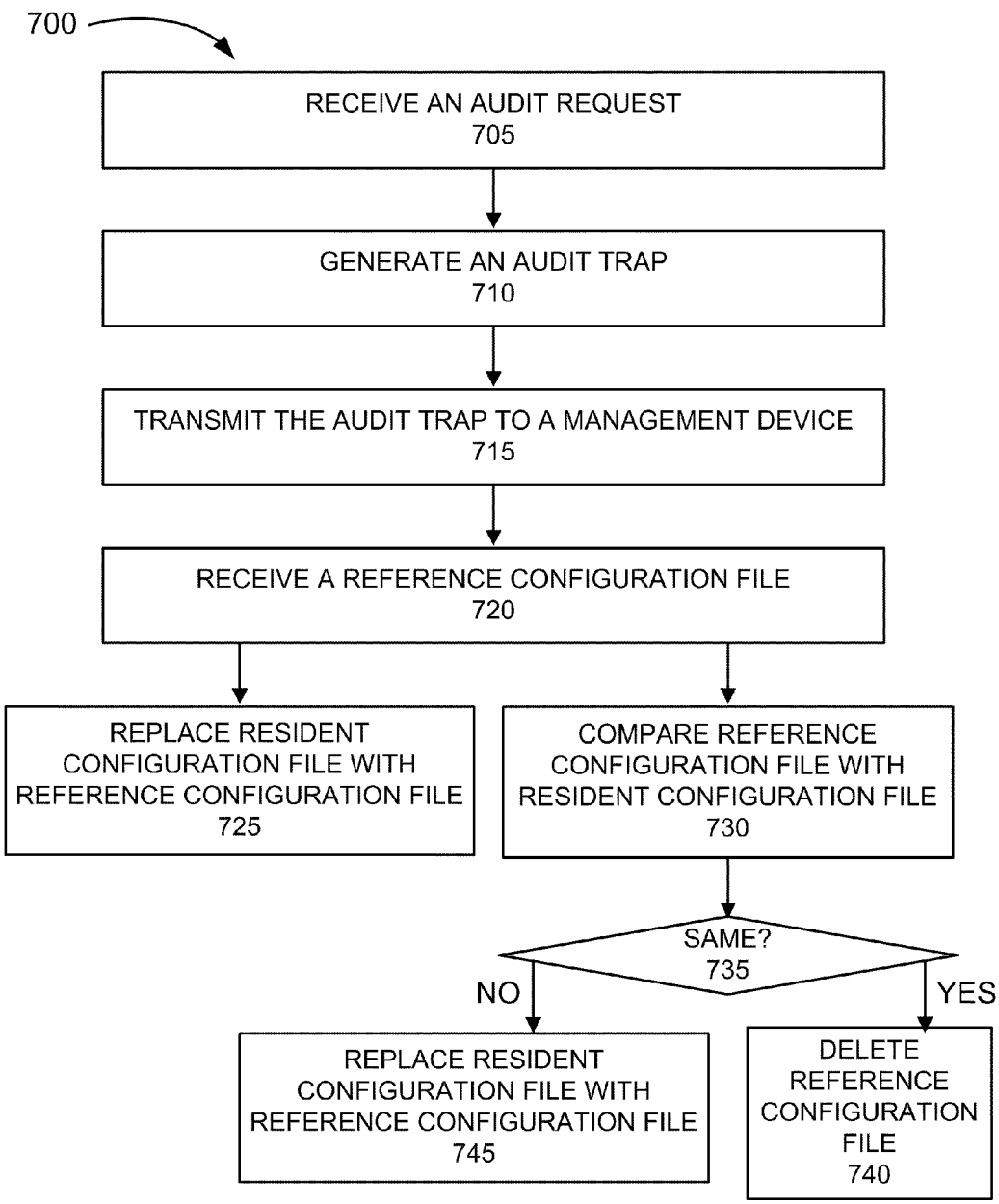
FIG. 7 is a flow diagram illustrating another exemplary process for implementing a trap-initiated audit.

FIG. 7 is a flow diagram illustrating another exemplary process 700 for implementing a trap-initiated audit. In one implementation, process 700 may be performed by NID 115.

Process 700 may include receiving an audit request (block 705). For example, as previously described with respect to FIG. 5 and elsewhere in this description, instead of error 125 being detected by error detector 305 and causing layer three trap packet 130 to be generated and transmitted to management device 120, layer three trap packet 130 may be user invoked. For example, an administrator may send audit request 515, via user terminal 510, to NID 115 (e.g., trap generator 315). In one implementation, audit request 515 may include error information 405. In other implementations, audit request 515 may not include error information. Audit request 515 may include information that instructs NID 115 to compare and/or replace 425, when reference configuration file 140 is received.

An audit trap may be generated (block 710). For example, as previously described, trap generator 315 may generate a trap packet 420 (e.g., layer three trap packet 130) based on audit request 515. In one implementation, for example, when audit request 515 includes error information 405, trap generator 315 may select an appropriate error code (e.g., corresponding to error 125) for the generated trap packet 420 to indicate that audit 410 should be performed. Alternatively, for example, when audit request 515 does not include error information 405, trap generator 315 may select a default error code for the generated trap packet 420 to indicate that audit 410 should be performed.

The audit trap may be transmitted to a management device (block 715). For example, as previously described, trap generator 315 may cause layer three trap packet 130 to be transmitted to management device 120.

A reference configuration file may be received (block 720). For example, as previously described, configuration file manager 320 may receive reference configuration file 140 from management device 120.

In one implementation, for example, depending on a type of error 125, configuration file manager 320 may perform compare and/or a replace 425 operations and/or processes with respect to a resident configuration file and reference configuration file 140. Alternatively, as previously mentioned, audit request 515 may indicate compare and/or replace information. Process 700 may continue, as described below, with respect to block 725 or blocks 730 through 745.

A resident configuration file may be replaced with the reference configuration file (block 725). For example, as previously described, in one implementation, configuration file manager 320 may replace the resident configuration file 140 without performing a comparison.

The reference configuration file may be compared with a resident configuration file (block 730). For example, as previously described, in another implementation, configuration file manager 320 may perform a comparison between the resident configuration file and reference configuration file 140.

If it is determined that the reference configuration file and the resident configuration file are the same (block 735—YES), the reference configuration file may be deleted (block 740). For example, as previously described, configuration file manager 320 may delete reference configuration file 140 from memory.

If it is determined that the reference configuration file and the resident configuration file are not the same (block 735—NO), the resident configuration file may be replaced with the reference configuration file (block 745). For example, as previously described, configuration file manager 320 may replace the resident configuration file with reference configuration file 140.

Although FIG. 7 illustrates an exemplary process 700, in other implementations, additional, fewer, and/or different operations than those described, may be performed. For example, as previously described, NID 115 may transmit a restore message to management device 120, which may indicate that NID 115 has successfully recovered. Alternatively, NID 115 may transmit a failure message to management device 120, which may indicate that NID 115 has not successfully recovered. In such instances, management device 120 and/or an administrator may take further corrective measures.

Figure 8:
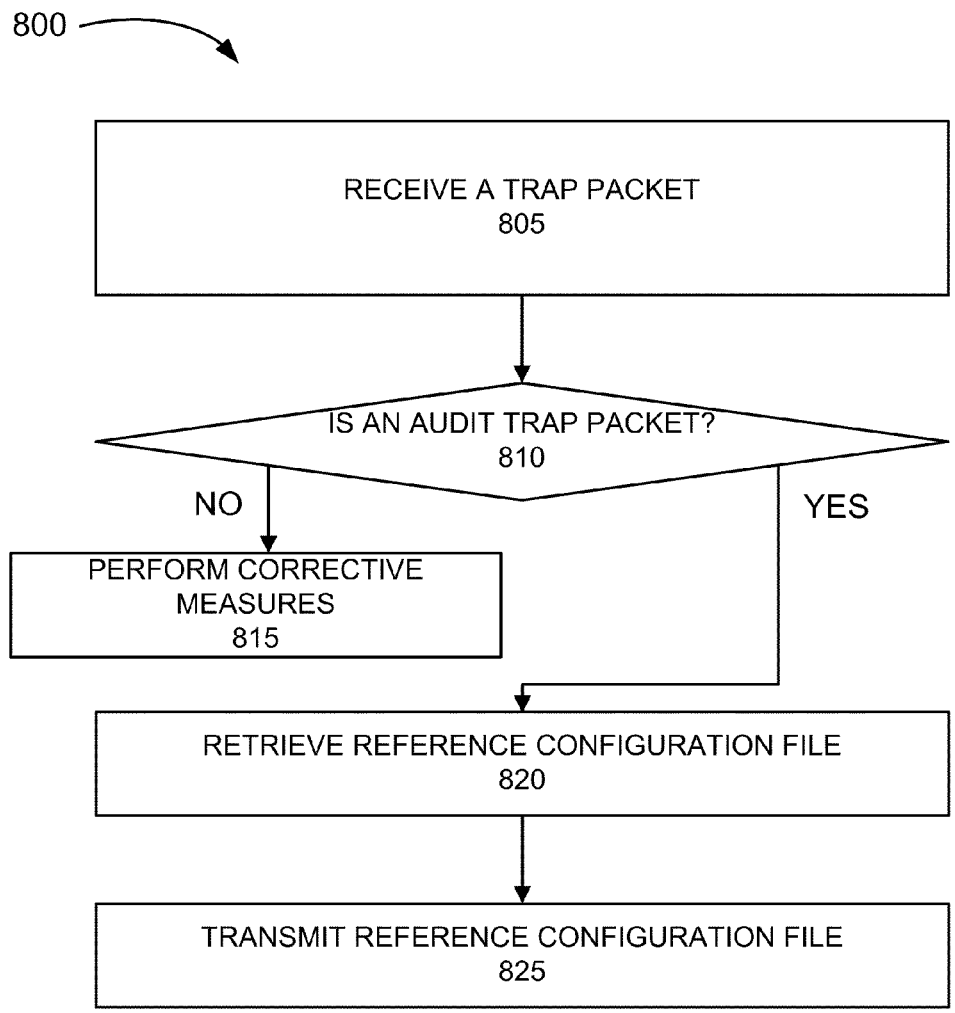
FIG. 8 is a flow diagram illustrating an exemplary process for providing a reference configuration file.

FIG. 8 is a flow diagram illustrating an exemplary process 800 for providing a reference configuration file. In one implementation, process 800 may be performed by management device 120.

Process 800 may include receiving a trap packet (block 805). For example, management device 120 may receive a trap packet from NID 115. The trap packet may indicate an error that occurred with respect to NID 115. In some instances, a trap packet may correspond to a layer three trap packet 130 that corresponds to an audit request. In other instances, the trap packet may not correspond to a layer three trap packet 130.

It may be determined whether an audit trap is received (block 810). For example, as previously described, management device 120 may determine, based on the error code included with trap packet, whether audit 135 of NID 115 needs to be performed. In one implementation, management device 120 may map the error code to information in a database (e.g., stored in memory/storage 255). The database may indicate whether audit 135 needs to be performed or some other type of corrective measure.

If it is determined that an audit trap is not received (block 810—NO), corrective measures may be performed (block 815). For example, management device 120 may appropriately respond to the received trap based on the information stored in the database.

If it is determined that an audit trap is received (block 810—YES), a reference configuration file may be retrieved (block 820). For example, management device 120 may retrieve reference configuration file 140 from memory or secondary storage (e.g., memory/storage 255).

The reference configuration file may be transmitted (block 825). For example, as previously described, management device 120 may transmit reference configuration file 140 to NID 115. For example, in one implementation, a file transfer protocol (FTP) transfer of reference configuration file 140 may be performed. In other implementations, other types of protocols may be utilized (e.g., Simple Network Management Protocol (SNMP), Secure Shell (SSH), etc.).

Although FIG. 8 illustrates an exemplary process 800, in other implementations, additional, fewer, and/or different operations than those described, may be performed.

The foregoing description of implementations provides illustration, but is not intended to be exhaustive or to limit the implementations to the precise form disclosed. Accordingly, modifications to the implementations described herein may be possible. For example, while the trap-based auditing scheme has been described with respect to NID 115, other network devices (e.g., routers, gateways, application servers, firewalls, etc.) may be utilize the trap-based auditing scheme described herein.

The term "may" is used throughout this application and is intended to be interpreted, for example, as "having the potential to," "configured to," or "being able to," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while series of blocks have been described with regard to the processes illustrated in FIGS. 6-8, the order of the blocks may be modified in other implementations. Further, non-dependent blocks may be performed in parallel.

It will be apparent that the devices, systems, and/or methods described herein may be implemented in many different forms of software or firmware in combination with hardware in the implementations illustrated in the figures. The actual software code (executable by hardware) or specialized control hardware used to implement these devices, systems, and/or methods does not limit the disclosure of the invention. Thus, the operation and behavior of devices, systems, and/or methods was described without reference to the specific software code—it being understood that software and control hardware can be designed to implement the devices, systems, and/or methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
   detecting, by a network device, an error associated with an operational state of the network device;
   determining, by the network device, based on the error, whether a resident configuration file needs to be audited;
   generating, by the network device, a trap packet that indicates an audit of the resident configuration file, when it is determined that the resident configuration file needs to be audited;
   transmitting, by the network device, the trap packet to another device;
   receiving, by the network device, a reference configuration file in response to transmitting the trap packet to the other device; and
   utilizing, by the network device, the reference configuration file to correct the error.

2. The method of claim 1, where the determining comprises:
   storing information, in a lookup table, that maps errors to corresponding diagnostic responses; and
   mapping the error to one of the diagnostic responses, based on the information in the lookup table, where the one of the diagnostic responses indicates the audit of the resident configuration file.

3. The method of claim 1, where the trap packet corresponds to a layer three trap packet that includes an error code that indicates the audit of the resident configuration file.

4. The method of claim 1, where the utilizing comprises:
   comparing the reference configuration file with the resident configuration file; and
   determining whether a difference between the reference configuration file and the resident configuration file exists based on the comparing.

5. The method of claim 4, further comprising:
   replacing the resident configuration file with the reference configuration file, when it is determined that the difference between the reference configuration file and the resident configuration file exists.

6. The method of claim 4, further comprising:
   deleting the reference configuration file, when it is determined that the difference between the resident configuration file and the reference configuration file does not exist.

7. The method of claim 1, further comprising:
   generating a trap packet that indicates an audit of the resident configuration file based on a user request.

8. The method of claim 1, where the utilizing comprises:
   replacing the resident configuration file with the reference configuration file without comparing the resident configuration file and the reference configuration file, where the replacing is based on a type of the error.

9. A method comprising:
   receiving, by a network management device, a layer three trap packet that includes an error code, from another device;
   determining, by the network management device, whether the layer three trap packet corresponds to an audit request;
   retrieving, by the network management device, a reference configuration file associated with the other device, when it is determined that the layer three trap packet corresponds to the audit request; and providing, by the network management device, the reference configuration file to the other device.

10. The method of claim 9, where the determining comprises:
mapping the error code to information corresponding to the audit request.

11. The method of claim 9, further comprising:
storing the reference configuration file of the other device.

12. A network device comprising:
one or more memories to store instructions; and
one or more processors to execute the instructions in the one or more memories to:
generate a layer three trap packet that includes an error code, the error code being indicative of a request for an audit of a configuration of the network device;
transmit the layer three trap packet to another device;
receive a reference configuration file in response to transmitting the layer three trap packet; and
utilize the reference configuration file to address the error code.

13. The network device of claim 12, where the one or more processors execute the instructions to:
detect an error associated with an operational state of the network device; and
generate the layer trap packet in response to the detected error.

14. The network device of claim 12, where, when utilizing the reference configuration file, the one or more processors execute the instructions to:
compare the reference configuration file with a resident configuration file; and
replace the resident configuration file with the reference configuration file when the comparing yields a difference between the resident configuration file and the reference configuration file.

15. The network device of claim 12, where, when utilizing the reference configuration file, the one or more processors execute the instructions to:
replace the resident configuration file with the reference configuration file.

16. The network device of claim 12, where the one or more processors execute the instructions to:
generate another layer three trap packet based on a user request;
transmit the other layer three trap packet to the other device;
receive another reference configuration file in response to the other layer three trap packet; and
utilize the other reference configuration file to address the user request.

17. The network device of claim 12, where the network device includes a network interface device (NID) that provides ingress and egress with respect to a customer domain and a service provider domain.

18. A network device comprising:
means for generating a layer three audit trap based on a user request or based on an error detected by the network device;
means for transmitting the layer three audit trap to another device;
means for receiving a reference configuration file, from the other device in response to the transmitting of the layer three audit trap;
means for comparing a resident configuration file with the reference configuration file; and
means for replacing the resident configuration file with the reference configuration file when a difference exists between the resident configuration file and the reference configuration file.

19. The network device of claim 18, further comprising:
means for detecting the error.

20. The network device of claim 18, where the layer three audit trap includes an indicator that requests a verification of the resident configuration file.

* * * * *